(12) United States Patent
Falk et al.

(10) Patent No.: US 8,933,780 B2
(45) Date of Patent: Jan. 13, 2015

(54) DEVICE AND METHOD FOR PROVIDING RFID IDENTIFICATION DATA FOR AN AUTHENTICATION SERVER

(75) Inventors: Rainer Falk, Erding (DE); Florian Kohlmayer, Starnberg (DE); Andreas Köpf, München (DE)

(73) Assignee: Siemens Aktiengesellschaft, Munich (DE)

( * ) Notice: Subject to any disclaimer, the term of this patent is extended or adjusted under 35 U.S.C. 154(b) by 489 days.

(21) Appl. No.: 12/527,906

(22) PCT Filed: Feb. 14, 2008

(86) PCT No.: PCT/EP2008/001131
§ 371 (c)(1),
(2), (4) Date: Nov. 18, 2009

(87) PCT Pub. No.: WO2008/101634
PCT Pub. Date: Aug. 28, 2008

(65) Prior Publication Data
US 2010/0079237 A1 Apr. 1, 2010

(30) Foreign Application Priority Data
Feb. 23, 2007 (DE) .......................... 10 2007 009 023

(51) Int. Cl.
*G05B 19/00* (2006.01)
*H04L 29/06* (2006.01)
*H04W 12/06* (2009.01)

(52) U.S. Cl.
CPC ............ *H04L 63/08* (2013.01); *H04L 63/0492* (2013.01); *H04W 12/06* (2013.01)

USPC ............................................ 340/5.8; 340/10.1

(58) Field of Classification Search
USPC ............ 340/10.1, 5.8, 572.1, 5.9, 539.1, 505, 340/691.1; 235/384, 493
See application file for complete search history.

(56) References Cited

U.S. PATENT DOCUMENTS

| 7,096,014 B2 * | 8/2006 | Haverinen et al. | 455/432.1 |
| 7,138,915 B2 * | 11/2006 | Morito et al. | 340/572.1 |
| 2005/0261970 A1 * | 11/2005 | Vucina et al. | 705/16 |
| 2006/0032901 A1 * | 2/2006 | Sugiyama et al. | 235/375 |
| 2006/0055538 A1 * | 3/2006 | Ritter | 340/572.1 |
| 2006/0073840 A1 * | 4/2006 | Akgun et al. | 455/456.3 |

(Continued)

FOREIGN PATENT DOCUMENTS

| CN | 1584911 A | 2/2005 | ............... G06K 7/00 |
| DE | 102004014411 A1 | 10/2005 | |

(Continued)

OTHER PUBLICATIONS

Dantu et al., "EAP Methods for Wireless Networks", Computer Standards and Interfaces, Elsevier Sequoia, Lausanne, CH, vol. 29, No. 3, Feb. 2, 2007, pp. 289-301: Others.

(Continued)

*Primary Examiner* — Brian Zimmerman
*Assistant Examiner* — An T Nguyen
(74) *Attorney, Agent, or Firm* — King & Spalding L.L.P.

(57) ABSTRACT

In a system (1) for transmitting RFID identifiers, which can be read from RFID tags (4), to an authentication server (6), at least one RFID protocol message, which is encoded in authentication messages, can be transmitted from an RFID reading unit (2A) to the authentication server (6).

18 Claims, 6 Drawing Sheets

(56) References Cited

U.S. PATENT DOCUMENTS

| | | | |
|---|---|---|---|
| 2006/0168644 A1* | 7/2006 | Richter et al. | 726/2 |
| 2007/0002140 A1 | 1/2007 | Benson | |
| 2007/0011269 A1* | 1/2007 | Jeon et al. | 709/217 |
| 2007/0045424 A1* | 3/2007 | Wang | 235/462.46 |
| 2007/0080784 A1 | 4/2007 | Kim et al. | |
| 2008/0148050 A1* | 6/2008 | Sparrell | 713/168 |

FOREIGN PATENT DOCUMENTS

| | | |
|---|---|---|
| KR | 100652023 B1 | 11/2006 |
| WO | WO 2005065261 A2 | 7/2005 |
| WO | WO 2006100714 A1 | 9/2006 |

OTHER PUBLICATIONS

ITU-T Draft Yong-Woon Kim et al., "Review Report of Standardization Issues on Network Aspects of Identification including RFID; D155", ITU-T Draft Study Period 2005-2008, International Telecommunication Union, Geneva, Ch, Study Group 17, Apr. 19, 2006, pp. 1-49,; Others.

International Search Report, PCT/EP2008/001131 14 pages, Aug. 13, 2009.

Standard IEEE 802.11 , IEEE Wireless LAN Edition, (1999; R2003): Others.

* cited by examiner

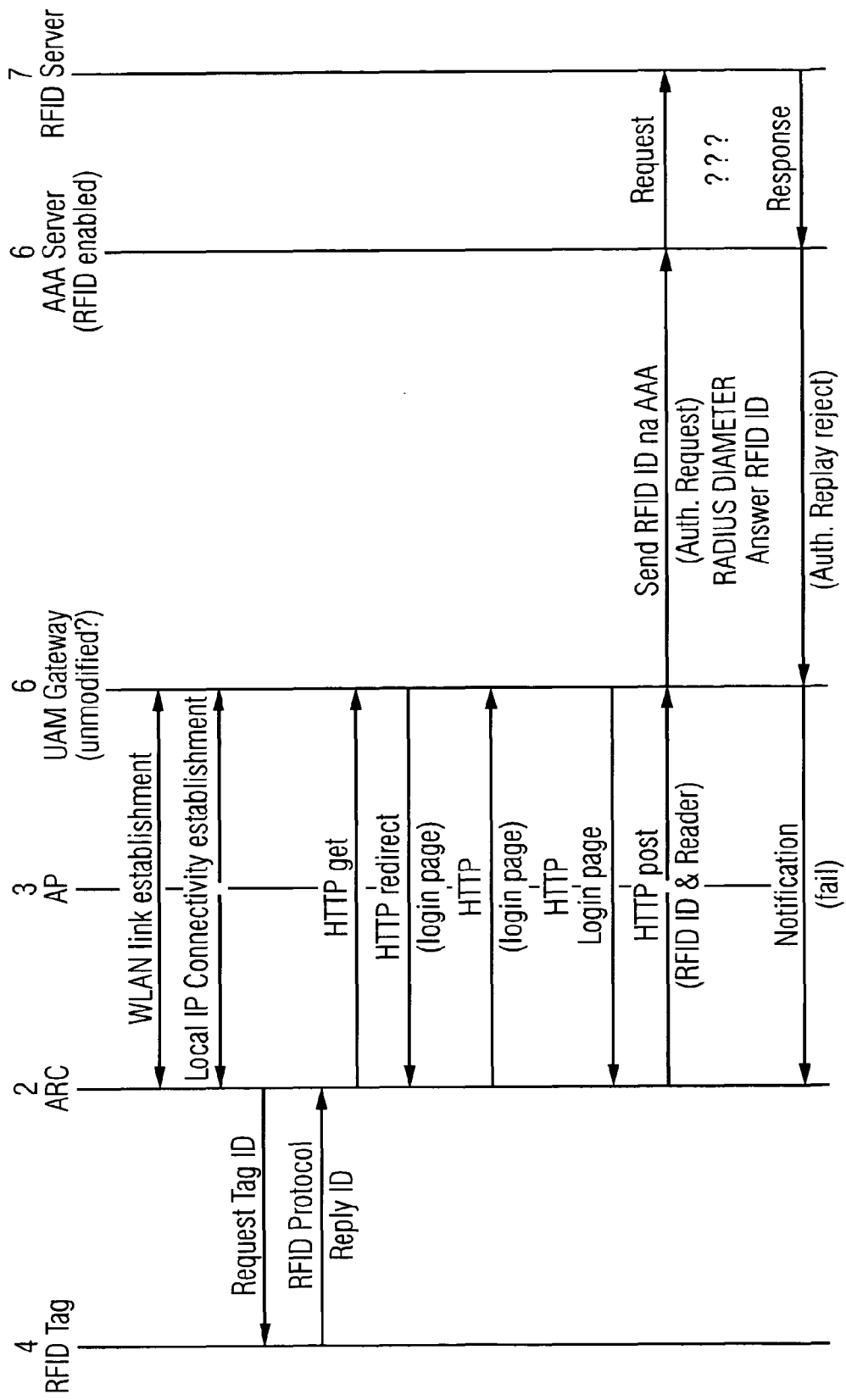

DEVICE AND METHOD FOR PROVIDING RFID IDENTIFICATION DATA FOR AN AUTHENTICATION SERVER

CROSS-REFERENCE TO RELATED APPLICATIONS

This application is a U.S. National Stage Application of International Application No. PCT/EP2008/001131 filed Feb. 14, 2008, which designates the United States of America, and claims priority to German Application No. 10 2007 009 023.6 filed Feb. 23, 2007, the contents of which are hereby incorporated by reference in their entirety.

TECHNICAL FIELD

The invention relates to an apparatus and a method for transmitting RFID identification data to an authentication server, for instance in an airport.

BACKGROUND

The radio frequency identification (RFID) enables automatic identification in order to localize objects.

In addition to a transponder, a conventional RFID system includes a reading device with an assigned antenna, which is also referred to as reader. Transponders on or in the objects store data which can be read in a contact-free fashion and without visual contact. Depending on the embodiment, i.e. depending on whether the transponder is active or passive and depending on the used frequency band transmission power as well as environmental influences, the range lies between a few centimeters and several kilometers. The data transmission between the transponder and the reading device takes place by means of electromagnetic waves.

RFID tags are used in various ways, for instance in logistics processes to authenticate people and objects. The RFID tags are registered by the RFID reading device which registers the data stored on the RFID tag and transmits it to so-called RFID middleware. The RFID reading units are usually connected to a data network in a wired manner. In this way the RFID reading device is connected to a PC by way of a serial interface RS-232 or USB for instance.

In some systems, a RFID reading unit is connected to a WLAN access point (AP) by way of a WLAN interface. The WLAN access point (AP) here guarantees the terminal access to the data network following successful authentication.

To this end, either an EAP-based WLAN link layer authentication or an authentication by way of a web browser of the WLAN client node takes place, which is connected to the RFID reading device, opposite a Web server. The connection to the data network is only established once the inputted user credentials have been successfully verified.

FIG. 1 shows an EAP-based WLAN access authentication according to the prior art. The communication between the WLAN access point and/or the base station and the authentication server takes place by way of the radius or diameter protocol. During the course of the authentication, a master session key MSK is sent as an attribute to the access point AP as part of an EAP success message. The master session key MSK is used for a 802.11 four-way handshake (4WHS) between the terminal and/or the WLAN station (STA) and the access point AP and/or the base station according to the 802.11 standard. The access node and/or access point AP operates as an authenticator and communicates directly with the authentication server and/or AAA server or by way of one or several AAA proxy servers, which route the authentication messages between the access point P and the authentication server.

A conventional RFID reading unit, which, as shown in FIG. 1, is connected to an authentication server by way of a WLAN interface and a WLAN access point AP only obtains network access following successful authentication. To this end, the RFID reading unit must be configured with WLAN security credentials and/or security configuration data. Only with suitable security credentials can the RFID reading unit transmit the registered RFID identification data via the WLAN interface, said identification data being read out from an RFID tag. This is however associated with considerable administration effort in respect of configuring the RFID reading unit. The configuration of an RFID reading unit with suitable security credentials is then particularly difficult, if the RFID reading unit is attached to a mobile transportation vehicle, for instance a truck or an airplane. In this case the RFID reading unit has to be configured such that it can be attached to different WLAN access points AP (global roaming). One example of such a situation is an RFID reading unit, which is attached to or in an airplane and which is to be attached to the respective airport infrastructure data network in an airport in order to support RFID-assisted airport logistics processes, like for instance the loading or unloading of airplanes, cabin cleaning or within the field of catering.

Operating an open or unprotected WLAN access point in order to prevent the configuration of the RFID reading unit to reduce the administration effort nevertheless brings about significant security risks.

SUMMARY

According to various embodiments, an apparatus and a method can be created, with which the administration effort involved in configuring the RFID reading unit is avoided and a secure data transmission is ensured at the same time.

According to an embodiment, an apparatus may comprise an RFID reading unit, which transmits at least one RFID protocol message encoded in authentication messages to an authentication server in order to transmit RFID identification data read out from RFID tags.

According to a further embodiment, the transmitted RFID protocol message may have an identifier of the RFID reading unit in addition to the RFID identification data. According to a further embodiment, an address of the authentication server may be configured in the apparatus. According to a further embodiment, an address of the authentication server can be determined on the basis of the RFID identification data by the apparatus. According to a further embodiment, the address of the authentication server may be contained in the RFID identification data. According to a further embodiment, the apparatus may have a memory for storing a table, in which addresses of authentication servers for different RFID identification data are stored. According to a further embodiment, the RFID identification data may be encoded in a network access identifier NAI of the authentication network. According to a further embodiment, the authentication message can be transmitted via an access network to the authentication server. According to a further embodiment, the access network can be a wireless access network. According to a further embodiment, the wireless access network can be a W-LAN network. According to a further embodiment, the wireless access network can be a WiMax network. According to a further embodiment, the authentication messages can be transmitted from the RFID reading unit via a wired access network to the authentication server. According to a further embodiment, the authentication messages can be transmitted by means of an EAP data transmission protocol. According to a further embodiment, authentication messages can be transmitted by means of a radius data transmission protocol. According to a further embodiment, the authentication messages can be transmitted by means of an HTTP data transmission protocol. According to a further embodiment, the authentication messages can be transmitted by way of at least one authentication proxy server to the authentication server. According to a further embodiment, the apparatus can be provided in a mobile transportation vehicle. According to a further embodiment, the transportation vehicle can be formed by a ship, an airplane or a truck.

According to another embodiment, a method for providing RFID identification data, which is read out from RFID tags, for an authentication server, may comprise the step of transmitting at least one RFID protocol message to the authentication server encoded in authentication messages.

According to yet another embodiment, a system for transmitting RFID identification data, which can be read out from RFID tags, to an authentication server, may comprise at least one RFID protocol message being transmittable to the authentication server encoded in authentication messages by an RFID reading unit.

BRIEF DESCRIPTION OF THE DRAWINGS

Embodiments of the apparatus and of the method are also described to explain features which are essential to the invention, in which:

FIG. 7 shows a message flowchart of an HTTP-based transmission of RFID identification data for displaying an additional possible embodiment of the method;

DETAILED DESCRIPTION

Figure 1:
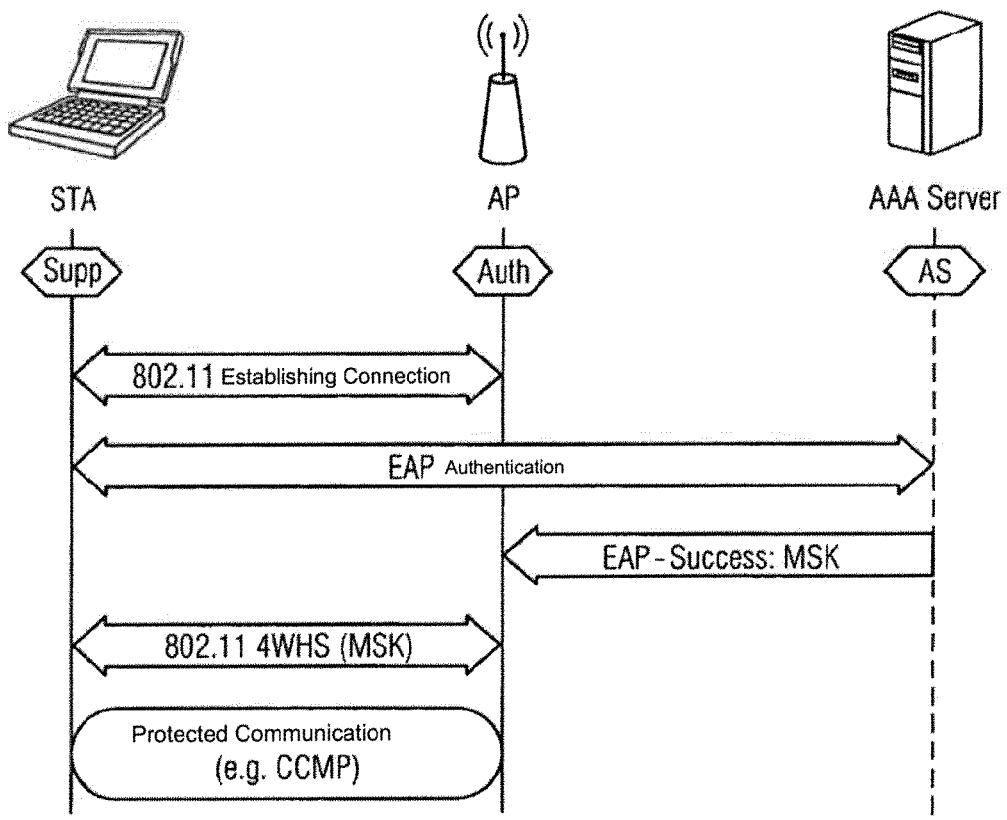
FIG. 1 shows a signal diagram for displaying an EAP-based WLAN access authentication process according to the prior art.

According to various embodiments, an apparatus can be created with an RFID reading unit, which transmits at least one RFID protocol message encoded in authentication messages to an authentication server from RFID identification data read out from RFID tags.

In one embodiment of the apparatus, the transmitted RFID protocol message has the RFID identifier and an identifier of the RFID reading unit.

In one embodiment of the apparatus, an address of the authentication server is configured in the apparatus.

In one embodiment of the apparatus, an address of the authentication server is determined by means of the apparatus on the basis of the RFID identifier.

In one embodiment of the apparatus, the address of the authentication server is contained in the RFID identifier.

In one embodiment of the apparatus, the apparatus has a memory for storing a table, in which addresses of authentication servers in respect of different RFID identifiers are stored.

In one embodiment of the apparatus, the RFID identifier is encoded in a network access identifier (NAI) of the authentication message.

In one embodiment of the apparatus, the authentication message is transmitted to the authentication server by way of an access network.

In one embodiment of the apparatus, the access network is a wireless access network.

In one embodiment of the apparatus, the wireless access network is a WLAN network.

In one embodiment of the apparatus, the wireless access network is a WiMax network.

In one embodiment of the apparatus, the authentication messages are transmitted from the RFID reading unit via a wired access network to the authentication server.

In one embodiment of the apparatus, the authentication messages are transmitted by means of an EAP data transmission protocol.

In one embodiment of the method, the authentication messages are transmitted by means of an AAA data transmission protocol.

In one embodiment of the method, the authentication messages are transmitted by means of a RADIUS data transmission protocol.

In one embodiment of the apparatus, the authentication messages are transmitted by means of a DIAMETER data transmission protocol.

In one embodiment of the apparatus, the authentication messages are transmitted by means of an HTTP data transmission protocol, In one embodiment of the apparatus, the authentication messages are transmitted to the authentication server by way of at least one authentication proxy server.

In one embodiment of the apparatus, the apparatus is provided in a mobile transportation vehicle.

In one embodiment of the apparatus, the transportation vehicle is formed by a ship, an airplane, an automobile or a truck.

According to further embodiments, a method for providing RFID identifiers, which are read out from RFID tags, for an authentication server can be created, with at least one RFID protocol message encoded into authentication messages being transmitted to the authentication server.

According to yet another embodiment, a system for transmitting RFID identifiers, which can be read out from RFID tags, to an authentication server can be created, with at least one RFID protocol message being transmittable to the authentication server in authentication messages encoded by an RFID reading unit.

Figure 2:
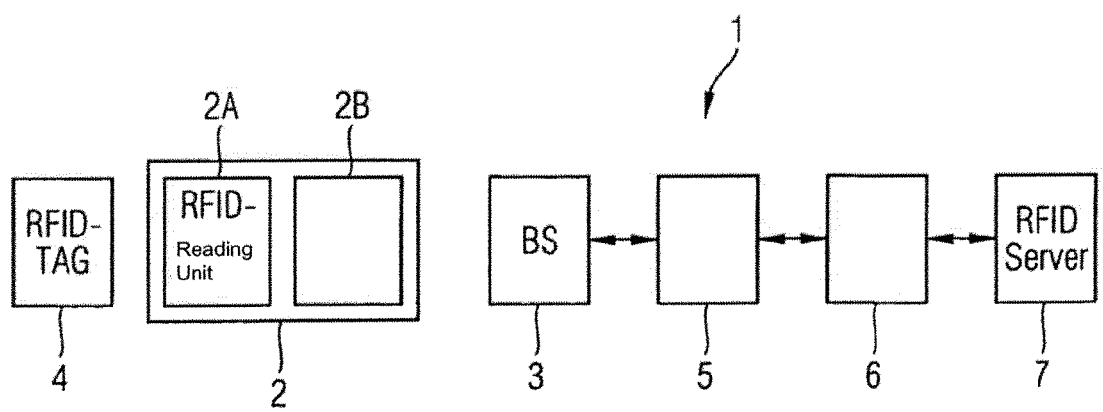
FIG. 2 shows a block diagram of one possible embodiment of the system for transmitting RFID identification data.

FIG. 2 shows one possible embodiment of a system 1 for transmitting RFID identification data. In one possible embodiment of an apparatus 2, this contains an RFID reading unit 2A and a client 2B for exchanging messages with a base station 3 by way of a radio interface. The RFID reading unit 2A reads RFID identification data from an RFID tag 4. The base station 3 is connected to an authentication server 6, which is in a home network of the apparatus 2, by way of at least one authentication proxy server 5 in the system 1 shown in FIG. 2. The authentication server 6 is for its part connected to an RFID server 7, which evaluates the transmitted RFID identification data. In the embodiment of the system 1 shown in FIG. 2, the RFID identification data read out from the RFID tags 4 is transmitted to the authentication server 6 encoded into at least one RFID protocol message by the apparatus 2. The base station 3 is directly or indirectly connected to the authentication home server 6 by way of the authentication proxy server 5.

In the exemplary embodiment shown in FIG. 2, the RFID reading unit 2A and the client computer 2B are integrated in an apparatus 2. In an alternative embodiment, the two units 2A, 2B can be locally separated from one another. In the embodiment shown in FIG. 2, the access network is a wireless access network with a base station 3, for instance a WLAN base station or a WiMax base station.

In an alternative embodiment, the authentication messages are not transmitted wirelessly but instead wired to the apparatus 2 with the authentication server 6, i.e. the access network is not wireless, as shown in FIG. 2, but instead a wired access network. The RFID reading unit 2A transmits an RFID protocol message via the client 2B, the base station 3, an authentication proxy server 5 provided if necessary to the authentication home server 6. Here the RFID identification data read out from the RFID tag is encoded in the RFID protocol message. In one possible embodiment, in addition to the RFID identification data, the transmitted RFID protocol also has an identifier of the RFID reading unit 2A.

In one possible embodiment, the address of the authentication server 6 is and/or can be preconfigured in the apparatus 2.

In one alternative embodiment, the address of the authentication server 6 is determined by the apparatus 2 on the basis of the read-out RFID identification data. For instance, the address of the authentication server 6 is contained in the read-out RFID identification data.

In one possible embodiment, the apparatus 2 has a memory for storing a table for instance, in which addresses of authentication servers 6 are stored for different RFID identification data.

In one possible embodiment, the RFID identification data, which is read out from the RFID tag 4 by the RFID reading unit 2A, is encoded in a network access identifier NAI of an authentication message.

The authentication messages can be transmitted by way of different data transmission protocols, for instance by means of an EAP data transmission protocol, by means of a radius data transmission protocol or by means of an HTTP data transmission protocol.

The apparatus 2 shown in FIG. 2 can be attached to a mobile transportation vehicle for instance. The transportation vehicle can be any type of transportation vehicle, for instance a ship, an airplane or a truck.

The RFID reading unit 2A shown in FIG. 2 generally does not read the RFID identification data from an individual RFID tag 4, but instead from several RFID tags 4 within its range. The RFID tags 4 are attached to the respective object in order to identify said object for instance.

The RFID data transmission protocols can generally differ in terms of tag and reading data protocols. The tag data transmission protocols determine the communication between the RFID tag 4 and the RFID reading unit 2A. Accordingly, the reader data transmission protocols define the message transmissions between the RFID reading unit 2A and the RFID background system, i.e. between the RFID reading unit 2A and the authentication home server 6. Different manufacturers of terminals and/or systems to some extent use different protocol implementations. A number of properties which support each RFID data transmission protocol exist independently of the manufacturer and the type of RFID tag 4. In the simplest case, with a tag data transmission protocol, the process is "singulation", "anti-collision" and "identity". The process "singulation" is provided here to uniquely identify and read out individual tags. The process "anti-collision" regulates the response timing for instance, in order to be able to directly read out individual tags 4. The property "identity" describes which data is stored in which manner on tag 4.

The reader data transmission protocols, which determine the communication between the RFID reading unit 2A and the authentication server 6, can be subdivided into "commands" and "notifications". A connected system uses the so-called "commands" and/or command messages to trigger actions on the RFID reading unit 2A, for instance to read out data or to modify a configuration. The "notifications" and/or display messages are messages which the RFID reading unit 2A sends to the system, for instance read out data, alarms or other error messages. With the system 1, as shown in FIG. 2, the RFID reading unit 2A and/or the apparatus 2 does not need to set up complete network access 1. Instead, the authentication messages transmitted during the network registration are used in the apparatus 2 to transmit the information and/or RFID identification data to be transmitted.

In a first embodiment of the apparatus 2, an RFID identifier is transmitted encoded in an authentication message. In a further embodiment, one and/or several RFID protocol messages is/are transmitted encoded in the authentication messages.

In an EAP-based network registration, the data and/or RFID identification data is encoded in the transmitted network access identifier NAI by way of EAP messages. Here either the registered identification data of the RFID tag 4 is transmitted or the RFID data transmission protocol is transmitted ciphered between the RFID tag 4 and the RFID reading unit 2A.

For the access nodes and/or access point AP and/or for the base station 3, as shown in FIG. 2, this data transmission is generally transparent, so that the base station 3 for this does not have to be adjusted accordingly. In one further possible design, the authentication proxy server can also forward the data transmission transparently, without having to be adjusted. In this case only the last/target authentication server has to be able to understand the messages. The RFID data is transmitted via the authentication infrastructure in the case of the embodiment of the system 1 shown in FIG. 2, i.e. via the base station 3 and the authentication proxy server 5 to the authentication home server 6.

Figure 3:
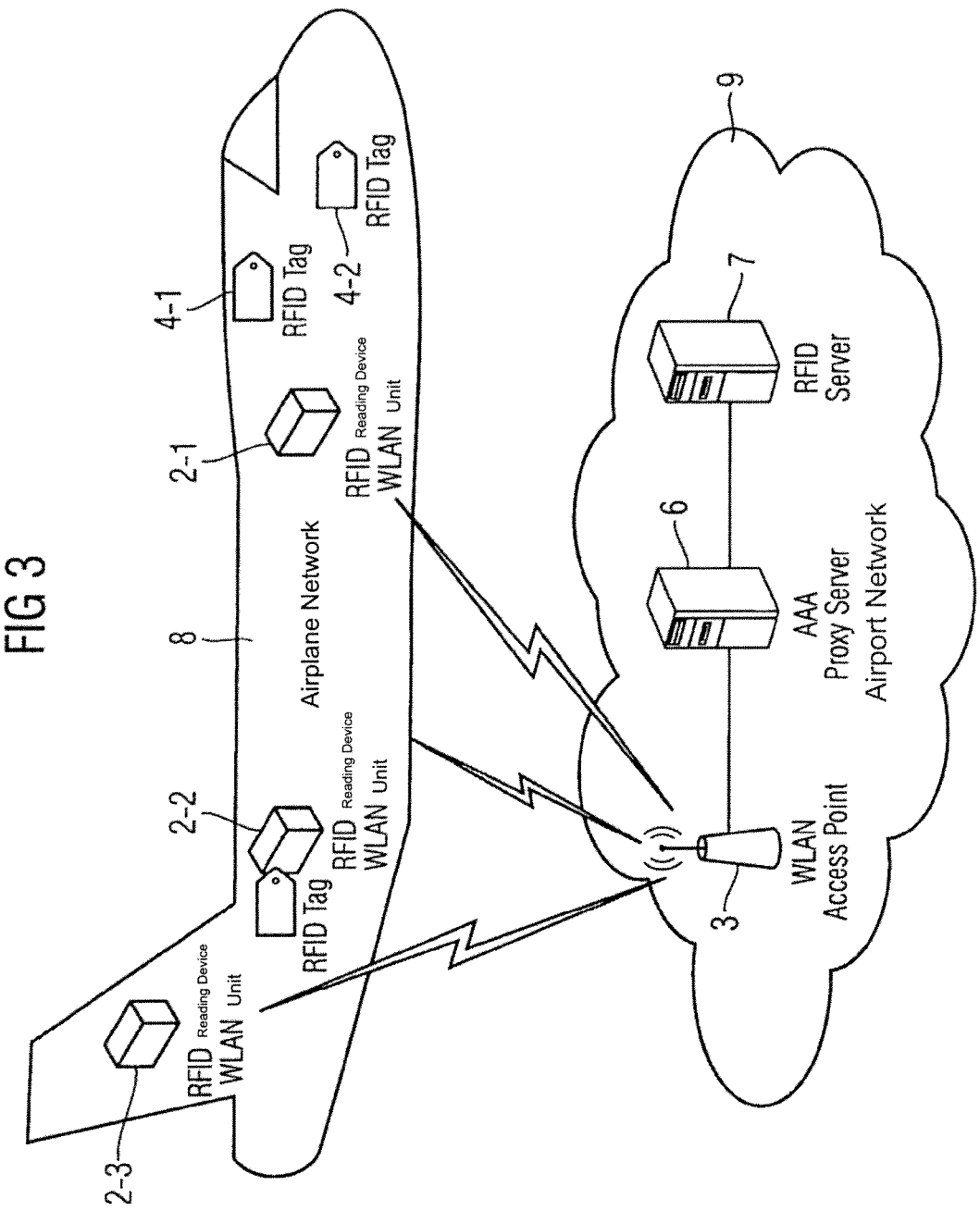
FIG. 3 shows an example of one possible embodiment of the system for transmitting RFID identification data.

FIG. 3 shows one example of a possible embodiment of the system 1 for transmitting RFID identification data. In the exemplary embodiment shown in FIG. 3, a transportation vehicle 8, for instance an airplane, has several apparatuses 2, which each contain an RFID reading unit 2A and client computer 2B, for instance a WLAN client. These communicate with a WLAN base station 3, which forms an access node to a network 9 of an airplane. The RFID tags 4 refer for instance to airplane components for verifying maintenance or also items of baggage or dollies for catering and personnel for cabin cleaning. The RFID identification data of these tags 4 is read out with the aid of the RFID reading units 2A located onboard the airplane 8 and are transmitted to the WLAN access point 3. Here the client computer provided in the apparatus 2 forms a WLAN interface in order to transmit the registered RFID identification data to the airport network 9.

Figure 4:
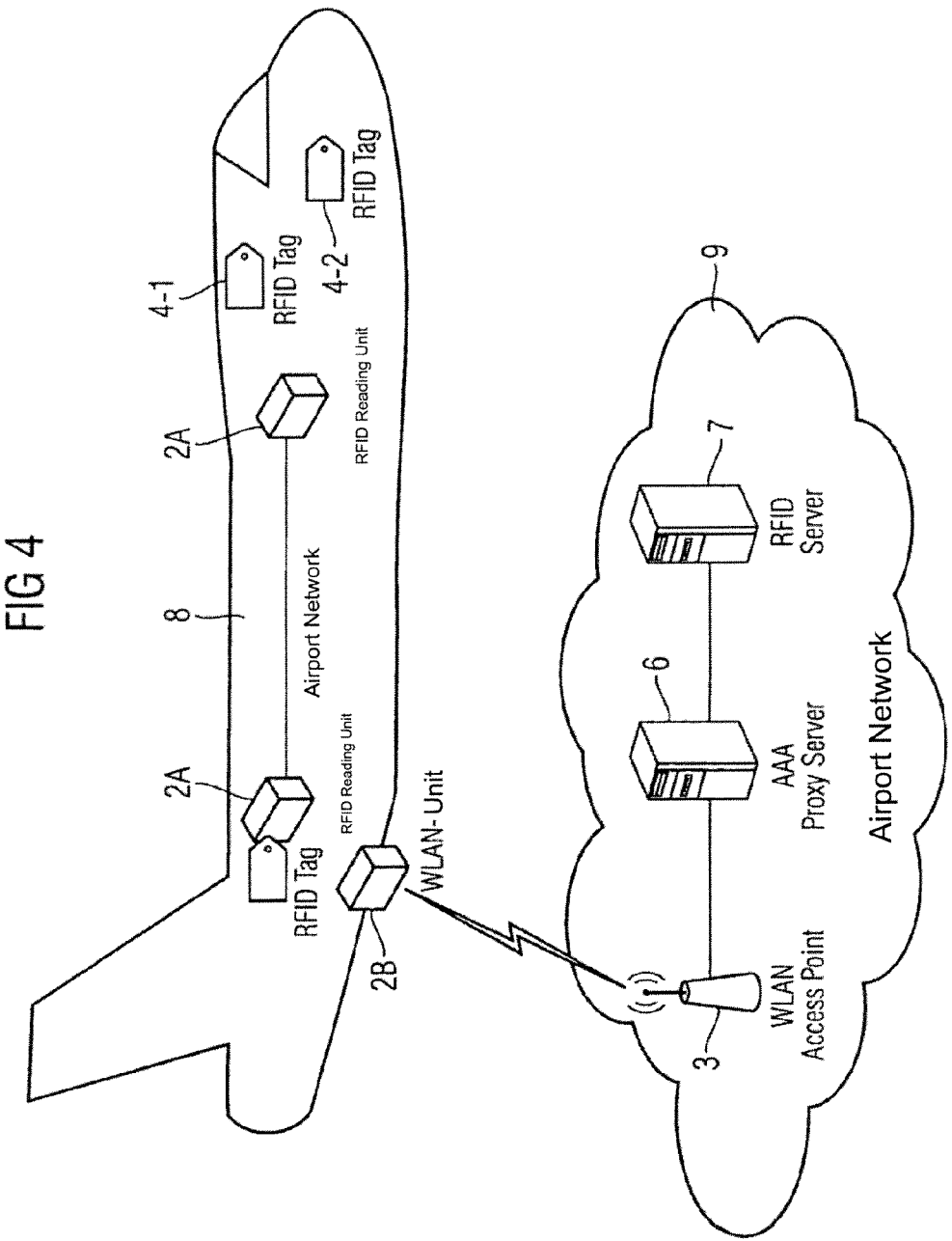
FIG. 4 shows a further example of a possible embodiment of the system for transmitting RFID identification data.

FIG. 4 shows an additional exemplary embodiment for several RFID reading units 2A, which transmit data to the airport network 9 by way of one single WLAN client in the airplane 8. To this end, the RFID reading units 2A are connected with one another by way of a local network.

With the embodiments shown in FIGS. 3, 4, the RFID event processing and/or the evaluation of the transmitted RFID identification data takes place within the airport data network 9 by means of an RFID server 7. This is particularly expedient with the use of airport logistics processes.

In an alternative embodiment, the RFID identification data is transmitted to remote servers, for instance to a server in an airline company, to a server in a services company or to a server in an airplane manufacturer. It is thus possible to forward the authentication messages from the authentication server 6 of the airport network 9 via any networks, for instance the internet, to the corresponding server. In one possible embodiment, the authentication proxy server 5, as shown in FIG. 2, forwards the authentication messages. In this case the airport network 9 does not have a local RFID event processing and/or does not have any RFID event processing server 7.

Figure 5:
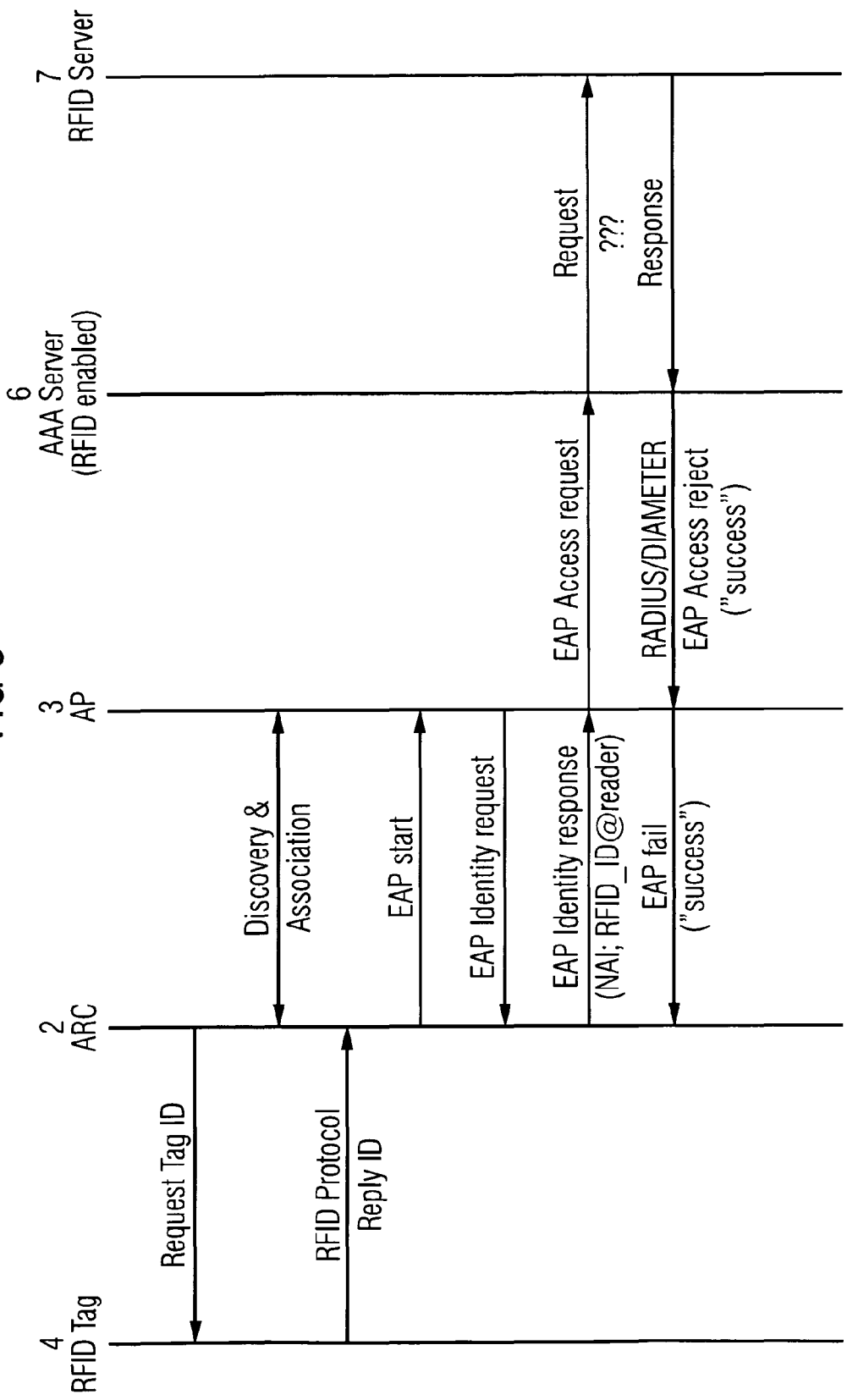
FIG. 5 shows a message flow chart for displaying an EAP-based transmission of RFID identification data according to one possible embodiment of the method.

FIG. 5 shows a message flow chart to display one possible embodiment of the method for providing RFID identification data, which is read out from the RFID tag 4. In the example shown in FIG. 5, an RFID identifier (RFID-ID) of the RFID tag 4 is registered by the RFID reading unit 2A of the apparatus 2. The access point 3 starts an EAP-based network work registration which conforms to the WLAN. In the embodiment shown in FIG. 5, the base station and/or the access point 3 receives a message with a network access identification NAI, which contains the read-out RFID identifier (RFID-ID).

A network access identifier NAI generally has the following data form: "user@realm", for instance mueller@lufthansa.com.

In a first embodiment, the RFID identifier and/or the RFID identification data RFID-ID is encoded in the user and/or user part, for instance RFID-ID@lufthansa.com.

In an alternative embodiment, the RFID identification data RFID-ID is encoded into the so-called realm part of the network access identifier NAI, for instance: reader@RFID-ID.lufthansa.com. In one possible embodiment, the identifier of the RFID reading unit 2A (ARC-ID) is also encoded into the authentication messages, for instance RFID-ID.arc-id@lufthansa.com or arc-id@RFID-ID.lufthansa.com.

Figure 6:
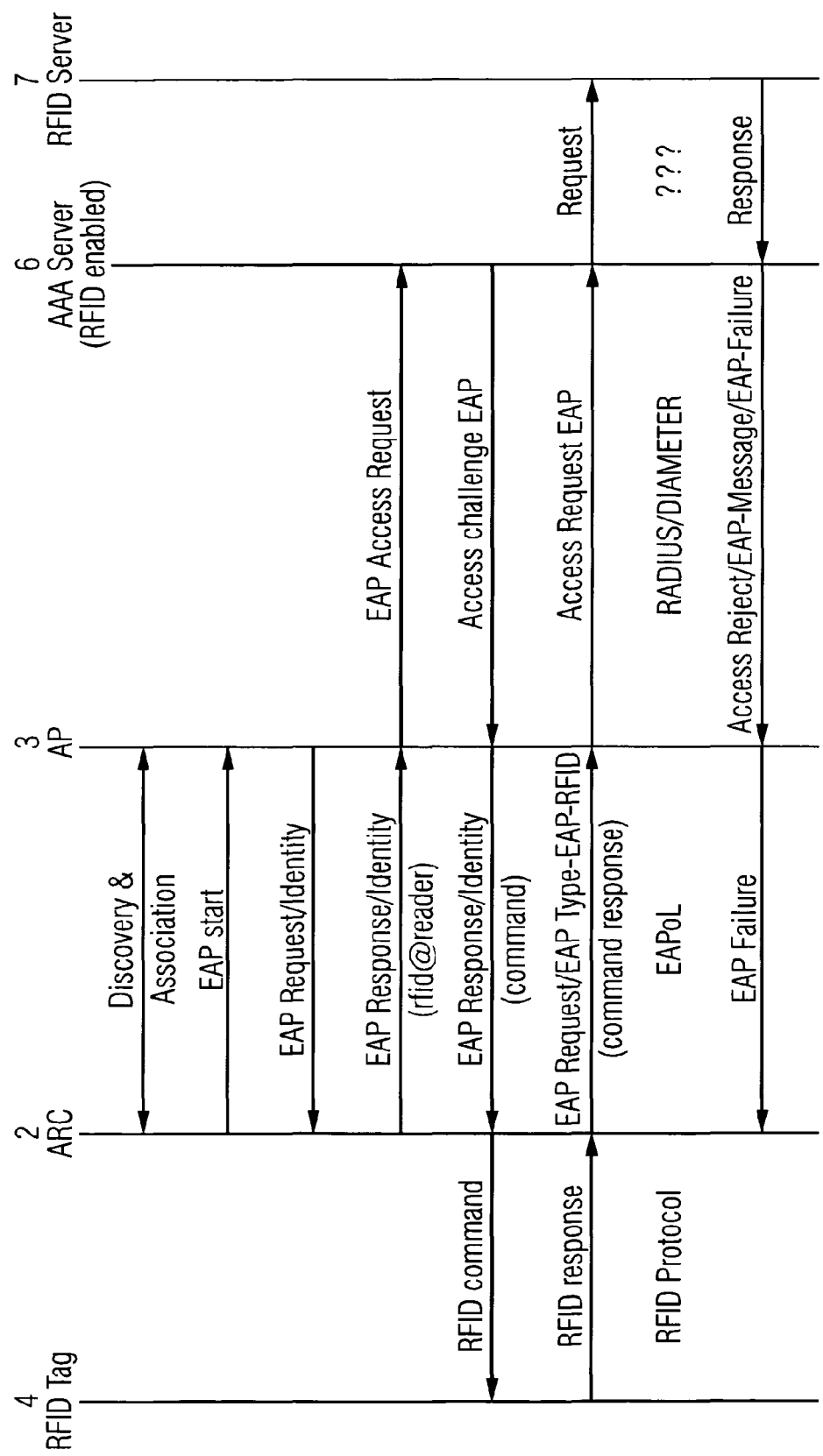
FIG. 6 shows a further message flow chart of an EAP-based transmission of RFID identification data according to a further embodiment of the method.

FIG. 6 shows an alternative embodiment, in which the RFID identification data is transmitted ciphered. In this embodiment, the registered RFID identification data is not transmitted itself, instead the RFID protocol messages for reading/changing the RFID identification tag are ciphered during data transmission. In this embodiment, the apparatus with the RFID-reading unit 2A and/or the ARC (Airplane RFID controller), which communicates with an RFID tag 4 by way of the air interface, does not have to identify the RFID data transmission protocol used in each instance. In this embodiment, an RFID reading unit which is attached to an airplane 8 can therefore be universally used in different airports, which use different RFID systems. It is in this way also possible to support more flexible, reliable RFID tags 4, i.e. RFID tags 4, in which only an identifier is transmitted in a cryptographically unprotected fashion. If the communication with the RFID tag 4 is cryptographically protected, e.g. by using a secret key method, in this embodiment the RFID reading unit 2A does not have to know the key material, but firstly the authentication server 6 and/or the RFID server 7. This is particularly expedient if an RFID reading unit 2A is attached to an airplane 8 and is to be used for airport RFID applications, since the RFID reading unit 2A does not generally have the necessary security credentials of the respective airport available to it within the airplane 8.

FIG. 7 shows a message flowchart to illustrate a further embodiment of the method. While in the case of the embodiments shown in FIGS. 5, 6, the data is transmitted by means of an EAP data transmission protocol, in the embodiment shown in FIG. 7, the data transmission takes place by means of an HTTP data transmission protocol. FIG. 7 shows the case of an HTTP-based WLAN authentication. In this embodiment, the authentication messages are encoded into corresponding HTTP messages instead of into the EAP messages.

What is claimed is:

1. An apparatus comprising an RFID reading unit,
wherein the apparatus is configured to transmit at least one RFID protocol message encoded in authentication messages to an authentication server in order to transmit RFID identification data read out from RFID tags,
wherein the apparatus and the authentication server are provided in an authentication-protected WLAN that regulates an authentication-based network access for authenticated communications between the apparatus and the authentication server,
wherein the authentication messages are transmitted to the authentication server via the authentication-protected WLAN using network registration messages, such that the apparatus communicates RFID identification data to the authentication server without the apparatus having established the authentication-based network access for authenticated communications between the apparatus and the authentication server.

2. The apparatus according to claim 1, wherein the transmitted RFID protocol message having an identifier of the RFID reading unit in addition to the RFID identification data.

3. The apparatus according to claim 1, wherein an address of the authentication server being configured in the apparatus.

4. The apparatus according to claim 1, wherein an address of the authentication server being determined on the basis of the RFID identification data by the apparatus.

5. The apparatus according to claim 4, wherein the address of the authentication server being contained in the RFID identification data.

6. The apparatus according to claim 1, wherein:
the apparatus includes a memory that stores a table of addresses of different authentication servers for different RFID identification data, and
the apparatus is programmed to:
read RFID information from an RFID tag,
identify the authentication server corresponding to the RFID information, and
forward the RFID information to the identified authentication server via an RFID protocol message encoded in an authentication message.

7. The apparatus according to claim 1, wherein the RFID identification data being encoded in a network access identifier NAI of an authentication network.

8. The apparatus according to claim 1, wherein the authentication message being transmitted via an access network to the authentication server.

9. The apparatus according to claim 8, wherein the access network being a wireless access network.

10. The apparatus according to claim 1, wherein the wireless access network being a WiMax network.

11. The apparatus according to claim 1, wherein the authentication messages being transmitted from the RFID reading unit via a wired access network to the authentication server.

12. The apparatus according to claim 1, wherein authentication messages being transmitted by means of a radius data transmission protocol.

13. The apparatus according to claim 1, wherein the authentication messages being transmitted by means of an HTTP data transmission protocol.

14. The apparatus according to claim 1, wherein the authentication messages being transmitted by way of at least one authentication proxy server to the authentication server.

15. The apparatus according to claim 1, wherein the apparatus being provided in a mobile transportation vehicle.

16. The apparatus according to claim 15, wherein the transportation vehicle comprises a ship, an airplane or a truck.

17. A method for providing RFID identification data, which is read out from RFID tags by an RFID apparatus including an RFID reader, to an authentication server, wherein the apparatus and the authentication server are provided in an authentication-protected WLAN that regulates an authentication-based network access for authenticated communications between the apparatus and the authentication server, the method comprising:
  the RFID apparatus transmitting at least one RFID protocol message to the authentication server encoded in authentication messages transmitted via the authentication-protected WLAN using network registration messaging, such that the RFID apparatus communicates RFID identification data to the authentication server without the apparatus having established the authentication-based network access for authenticated communications between the apparatus and the authentication server.

18. A system for transmitting RFID identification data, which can be read out from RFID tags, to an authentication server, comprising at least one RFID protocol message being transmittable to the authentication server encoded in authentication messages by an RFID reading unit,
  wherein the apparatus and the authentication server are provided in an authentication-protected WLAN that regulates an authentication-based network access for authenticated communications between the apparatus and the authentication server,
  wherein the authentication messages are transmitted to the authentication server via the authentication-protected WLAN using network registration messages, such that the RFID reading unit communicates RFID identification data to the authentication server without the RFID reading unit having established the authentication-based network access for authenticated communications between the apparatus and the authentication server.

\* \* \* \* \*